United States Patent
Oyanagi et al.

(10) Patent No.: US 10,910,009 B2
(45) Date of Patent: *Feb. 2, 2021

(54) MAGNETIC TAPE HAVING A CHARACTERIZED MAGNETIC LAYER AND METHOD OF MANUFACTURING THE SAME

(71) Applicant: FUJIFILM Corporation, Tokyo (JP)

(72) Inventors: Masahito Oyanagi, Minami-ashigara (JP); Norihito Kasada, Minami-ashigara (JP); Toshio Tada, Minami-ashigara (JP); Takuro Sugiyama, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 16/012,018

(22) Filed: Jun. 19, 2018

(65) Prior Publication Data

US 2018/0301165 A1 Oct. 18, 2018

Related U.S. Application Data

(63) Continuation of application No. 15/241,297, filed on Aug. 19, 2016, now Pat. No. 10,026,434.

(30) Foreign Application Priority Data

Aug. 21, 2015 (JP) .................. 2015-164161

(51) Int. Cl.
*G11B 5/78* (2006.01)
*G11B 5/708* (2006.01)
(Continued)

(52) U.S. Cl.
CPC .............. *G11B 5/78* (2013.01); *G11B 5/7085* (2013.01); *G11B 5/70678* (2013.01); *G11B 5/71* (2013.01);
(Continued)

(58) Field of Classification Search
None
See application file for complete search history.

(56) References Cited

U.S. PATENT DOCUMENTS 3,966,686 A 6/1976 Asakura et al.
4,112,187 A 9/1978 Asakura et al.
(Continued)

FOREIGN PATENT DOCUMENTS

CN 1691139 A 11/2005
CN 101105949 A 1/2008
(Continued)

OTHER PUBLICATIONS

Office Action dated Oct. 5, 2017 from the United States Patent and Trademark Office in U.S. Appl. No. 15/241,286.
(Continued)

*Primary Examiner* — Kevin M Bernatz
(74) *Attorney, Agent, or Firm* — Sughrue Mion, PLLC

(57) ABSTRACT

The magnetic tape has a magnetic layer containing ferromagnetic powder and binder on a nonmagnetic support, wherein the centerline average surface roughness Ra as measured on the surface on the magnetic layer side of the magnetic tape is less than or equal to 1.8 nm, and the logarithmic decrement as determined by a pendulum viscoelasticity test on the surface on the magnetic layer side of the magnetic tape is less than or equal to 0.050.

14 Claims, 4 Drawing Sheets

(51) Int. Cl.
　　　*G11B 5/842*　　　(2006.01)
　　　*G11B 5/71*　　　(2006.01)
　　　*G11B 5/714*　　　(2006.01)
　　　*G11B 5/712*　　　(2006.01)
　　　*G11B 5/706*　　　(2006.01)

(52) U.S. Cl.
　　　CPC .............. *G11B 5/712* (2013.01); *G11B 5/714* (2013.01); *G11B 5/842* (2013.01)

(56) References Cited

U.S. PATENT DOCUMENTS

| | | |
|---|---|---|
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,006,406 A | 4/1991 | Kovacs |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,835,461 B1 | 12/2004 | Yamagata et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,656,602 B2 | 2/2010 | Iben et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 * | 9/2013 | Imaoka .................. G11B 5/70 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 10/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 * | 5/2018 | Kaneko ............ G11B 5/00826 |
| 9,978,414 B1 | 5/2018 | Kaneko et al. |
| 9,984,710 B2 * | 5/2018 | Kasada .................. G11B 5/68 |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 * | 7/2018 | Kasada .................. G11B 5/842 |
| 10,026,434 B2 * | 7/2018 | Oyanagi .............. G11B 5/7085 |
| 10,026,435 B2 | 7/2018 | Kasada et al. |
| 10,062,403 B1 * | 8/2018 | Kasada .................. G11B 5/70 |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,403,314 B2 * | 9/2019 | Kasada .................. G11B 5/584 |
| 10,403,320 B2 * | 9/2019 | Kasada .................. G11B 5/78 |
| 10,431,250 B2 * | 10/2019 | Tada .................. G11B 5/00813 |
| 10,438,624 B2 * | 10/2019 | Kasada ................ G11B 5/7085 |
| 10,438,625 B2 * | 10/2019 | Ozawa .................. G11B 5/78 |
| 10,453,488 B2 * | 10/2019 | Kurokawa ........... G11B 5/7013 |
| 10,460,756 B2 * | 10/2019 | Kasada .................. G11B 5/70 |
| 10,482,913 B2 * | 11/2019 | Kasada .................. G11B 5/70 |
| 10,497,384 B2 * | 12/2019 | Kasada .................. G11B 5/70 |
| 10,515,657 B2 * | 12/2019 | Kasada .................. G11B 5/48 |
| 10,515,660 B2 * | 12/2019 | Oyanagi .................. G11B 5/66 |
| 10,522,171 B2 * | 12/2019 | Kasada .................. G11B 5/70 |
| 10,546,602 B2 * | 1/2020 | Kasada .................. G11B 5/3903 |
| 10,573,338 B2 * | 2/2020 | Kasada .................. G11B 5/73 |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0228492 A1 | 12/2003 | Ejiri et al. |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |

(56) References Cited

U.S. PATENT DOCUMENTS

| | | |
|---|---|---|
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada |
| 2017/0372736 A1 | 12/2017 | Kaneko et al. |
| 2017/0372737 A1 | 12/2017 | Oyanagi |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1* | 1/2019 | Kasada ............... G11B 5/70678 |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |

(56) References Cited

U.S. PATENT DOCUMENTS

| | | | |
|---|---|---|---|
| 2019/0103131 A1* | 4/2019 | Kasada | G11B 5/8404 |
| 2019/0103133 A1 | 4/2019 | Ozawa et al. | |
| 2019/0103134 A1 | 4/2019 | Kasada et al. | |
| 2019/0103135 A1 | 4/2019 | Ozawa et al. | |
| 2019/0130936 A1 | 5/2019 | Kaneko et al. | |
| 2019/0259416 A1 | 8/2019 | Kawakami et al. | |
| 2019/0295587 A1* | 9/2019 | Kasada | G11B 5/00813 |
| 2019/0295590 A1 | 9/2019 | Kaneko et al. | |
| 2019/0304496 A1 | 10/2019 | Fujimoto | |
| 2020/0005814 A1 | 1/2020 | Kasada et al. | |
| 2020/0005818 A1* | 1/2020 | Kasada | G11B 15/46 |
| 2020/0005822 A1 | 1/2020 | Kasada et al. | |
| 2020/0005827 A1 | 1/2020 | Ozawa et al. | |
| 2020/0035262 A1 | 1/2020 | Kasada | |
| 2020/0126589 A1 | 4/2020 | Iwamoto et al. | |

FOREIGN PATENT DOCUMENTS

| | | |
|---|---|---|
| CN | 105324650 A | 2/2016 |
| DE | 101 46 429 A1 | 3/2002 |
| EP | 0 520 155 B1 | 8/1996 |
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 1-276424 A | 11/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 9-73626 A | 3/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-5793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-038579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-245515 A | 10/2009 |
| JP | 2009-283082 A | 12/2009 |
| JP | 2010-036350 A | 2/2010 |
| JP | 2010-049731 A | 3/2010 |
| JP | 2011-48878 A | 3/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |
| JP | 2016-139451 A | 8/2016 |
| JP | 2016-177851 A | 10/2016 |
| JP | 2017-041291 A | 2/2017 |

OTHER PUBLICATIONS

Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Office Action dated Oct. 5, 2017 in parent U.S. Appl. No. 15/241,297.
Notice of Allowance dated Mar. 21, 2018 in parent U.S. Appl. No. 15/241,297.
Derwent Abstract of JP 2002-367318A (Year: 2002).
U.S. Appl. No. 15/241,286, Norihito Kasada, filed Aug. 19, 2016.
U.S. Appl. No. 15/241,631, Kasada et al., filed Aug. 19, 2016.
U.S. Appl. No. 15/378,907, Norihito Kasada, filed Dec. 14, 2016,.
U.S. Appl. No. 15/241,297, Oyanagi et al., filed Aug. 19, 2016.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Allowed.
U.S. Appl. No. 15/422,821, Allowed; QPIDS filed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed.
U.S. Appl. No. 15/614,876, Patented as U.S. Pat. No. 10,431,248.
U.S. Appl. No. 15/620,916, Allowed.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Pat. No. 9,959,894.
U.S. Appl. No. 15/388,911, Allowed.
U.S. Appl. No. 14/753,227, Patented as U.S. Pat. No. 9,601,146.
U.S. Appl. No. 15/380,309, Patented as U.S. Pat. No. 10,403,319.

(56) References Cited

OTHER PUBLICATIONS

U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433[1].
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Allowed.
U.S. Appl. No. 15/900,080, Allowed.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Allowed.
U.S. Appl. No. 15/899,587, Pending.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,403[2].
U.S. Appl. No. 15/900,141, Allowed.
U.S. Appl. No. 15/900,160, Patented as U.S. Pat. No. 10,438,625.
U.S. Appl. No. 15/900,345, Allowed; QPIDS filed.
U.S. Appl. No. 15/900,379, Patented as U.S. Pat. No. 10,453,488.
U.S. Appl. No. 16/012,018 (the present Application), Pending.
U.S. Appl. No. 15/920,616, Patented as U.S. Pat. No. 10,438,623.
U.S. Appl. No. 15/900,242, Allowed.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Patented as U.S. Pat. No. 10,438,622.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
U.S. Appl. No. 15/854,397, Pending.
U.S. Appl. No. 15/854,329, Patented as U.S. Pat. No. 9,984,712.
U.S. Appl. No. 14/838,663, Abandoned.
Advisory Action dated Jul. 5, 2018 in U.S. Appl. No. 14/838,663.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).

(56) References Cited

OTHER PUBLICATIONS

Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.

(56) References Cited

OTHER PUBLICATIONS

Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Aug. 23, 2019 in U.S. Appl. No. No. 15/854,409.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.

(56) References Cited

OTHER PUBLICATIONS

Office Action dated Sep. 24, 2019 in Japanese Application No. 2017-029508.
Office Action dated Sep. 24, 2019 in Japanese Application No. 2017-065730.
Office Action dated Sep. 3, 2019 in Japanese Application No. 2016-254434.
Office Action dated Oct. 1, 2019 in Japanese Application No. 2017-029495.
Office Action dated Oct. 1, 2019 in Japanese Application No. 2017-029493.
Office Action dated Oct. 1, 2019 in Japanese Application No. 2017-029494.
Office Action dated Oct. 2, 2019 in U.S. Appl. No. 15/443,094.
Office Action dated Oct. 8, 2019 in Japanese Application No. 2017-029492.
Office Action dated Oct. 8, 2019 in Japanese Application No. 2017-065700.
Office Action dated Oct. 8, 2019 in Japanese Application No. 2017-065708.
Office Action dated Oct. 8, 2019 in Japanese Application No. 2017-065678.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.
Office Action dated Dec. 10, 2019 in Japanese Application No. 2016-254428.
Office Action dated Dec. 17, 2019 in Japanese Application No. 2016-254430.
Office Action dated Dec. 17, 2019 in Japanese Application No. 2016-254432.
Office Action dated Dec. 17, 2019 in Japanese Application No. 2017-029507.
Office Action dated Dec. 24, 2019 in Japanese Application No. 2016-254434.
Office Action dated Dec. 24, 2019 in Japanese Application No. 2017-029510.
Office Action dated Nov. 26, 2019 in Japanese Application No. 2016-254421.
Office Action dated Nov. 26, 2019 in Japanese Application No. 2017-029496.
Office Action dated Nov. 26, 2019 in Japanese Application No. 2017-029502.
Office Action dated Nov. 26, 2019 in Japanese Application No. 2017-065694.
Advisory Action dated Jan. 17, 2020 in U.S. Appl. No. 15/443,094.
Notice of Allowance dated Feb. 20, 2020 in U.S. Appl. No. 15/705,531.
Notice of Allowance dated Feb. 7, 2020 in U.S. Appl. No. 16/440,161.
Office Action dated Feb. 21, 2020 in U.S. Appl. No. 16/038,514.
Office action dated Jan. 28, 2020 in U.S. Appl. No. 15/442,961.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,771.
Office Action dated Mar. 10, 2020 in U.S. Appl. No. 16/038,847.
Office Action dated Mar. 10, 2020 in U.S. Appl. No. 16/038,884.
Office Action dated Mar. 10, 2020 in U.S. Appl. No. 16/142,560.
Office Action dated Mar. 10, 2020 in U.S. Appl. No. 16/143,747.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 10, 2020 in U.S. Appl. No. 16/038,687.
Notice of Allowance dated Mar. 18, 2020 in U.S. Appl. No. 16/037,564.
Notice of Allowance dated May 7, 2020 in U.S. Appl. No. 16/038,514.
Office Action dated Apr. 1, 2020 in U.S. Appl. No. 15/443,094.
Office Action dated Mar. 31, 2020 in U.S. Appl. No. 15/443,026.
Office Action dated Jul. 8, 2020 in U.S. Appl. No. 15/442,961.
Notice of Allowance dated Jul. 24, 2020 in U.S. Appl. No. 16/037,596.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,687.
Notice of Allowance dated Jul. 30, 2020 in U.S. Appl. No. 16/038,545.
Notice of Allowance dated Aug. 3, 2020 in U.S. Appl. No. 16/038,884.
Notice of Allowance dated Aug. 3, 2020 in U.S. Appl. No. 16/038,847.
Office Action dated Mar. 10, 2020 in U.S. Appl. No. 16/038,545.
Office Action dated Aug. 25, 2020 in Chinese Application No. 201711439496.2.
Notice of Allowance dated Aug. 17, 2020 in U.S. Appl. No. 15/443,026.
Notice of Allowance dated Sep. 23, 2020 in U.S. Appl. No. 15/443,094.
Notice of Allowance dated Nov. 13, 2020 in U.S. Appl. No. 15/442,961.

* cited by examiner

MAGNETIC TAPE HAVING A CHARACTERIZED MAGNETIC LAYER AND METHOD OF MANUFACTURING THE SAME

CROSS REFERENCE TO RELATED APPLICATIONS

This is a Continuation of U.S. application Ser. No. 15/241,297 filed Aug. 19, 2016, now issued as U.S. Pat. No. 10,026,434 on Jul. 17, 2018, which application claims priority under 35 U.S.C 119 to Japanese Patent Application No. 2015-164161 filed on Aug. 21, 2015. The above applications are hereby expressly incorporated by reference, in their entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data backup. Signals are normally recorded on and reproduced from magnetic tapes by running a magnetic tape in a drive and causing a magnetic head (referred to simply as a "head" hereinafter) to come into sliding contact with the surface of the magnetic layer side of the magnetic tape.

In the field of magnetic recording, there is constant demand for enhanced electromagnetic characteristics. In this regard, for example, as described in Japanese Unexamined Patent Publication (KOKAI) No. 2010-049731, which is expressly incorporated herein by reference in its entirety, a magnetic recording medium with good electromagnetic characteristics can be obtained by enhancing the surface smoothness of the magnetic layer (that is, the surface smoothness on the magnetic layer side of the magnetic tape) (for example, see Japanese Unexamined Patent Publication (KOKAI) No. 2010-049731, paragraphs 0020 and 0178).

SUMMARY OF THE INVENTION

Increasing the smoothness of the surface on the magnetic layer side of a magnetic tape (also referred to simply as the "magnetic tape surface" hereinafter) is an effective way to narrow the gap (spacing) between the magnetic tape surface and the head and enhance the electromagnetic characteristics.

However, based on investigation by the present inventors, in magnetic tapes in which the surface smoothness has been increased to enhance the electromagnetic characteristics, the phenomenon of a drop in reproduction output appears with repeated running. That is, it is has been found difficult to both improve the electromagnetic characteristics and inhibit the drop in reproduction output with repeated running by just increasing the surface smoothness of the magnetic tape.

An aspect of the present invention provides for a magnetic tape exhibiting good electromagnetic characteristics and in which the drop in reproduction output with repeated running is inhibited.

An aspect of the present invention relates to a magnetic tape having a magnetic layer containing ferromagnetic powder and binder on a nonmagnetic support, wherein the centerline average surface roughness Ra as measured on the surface on the magnetic layer side of the magnetic tape is less than or equal to 1.8 nm, and the logarithmic decrement as determined by a pendulum viscoelasticity test on the surface on the magnetic layer side of the magnetic tape is less than or equal to 0.050.

The above magnetic tape can exhibit good electromagnetic characteristics and can inhibit the drop in reproduction output with repeated running. The presumptions of the present inventors in this regard will be given further below.

In one embodiment, the logarithmic decrement is greater than or equal to 0.010 but less than or equal to 0.050.

In one embodiment, the centerline average surface roughness Ra is greater than or equal to 1.2 nm but less than or equal to 1.8 nm.

In one embodiment, the magnetic layer contains at least one type of nonmagnetic filler. In the present invention and the present specification, the term "nonmagnetic filler" is synonymous with the term "nonmagnetic powder," and means an aggregation of multiple nonmagnetic particles. The term "aggregation" is not limited to forms in which the constituent particles are in direct contact, but also includes forms in which binder, additives, or the like are present between the particles. The word "particles" is sometimes also used to denote powder. The same applies to the various powders in the present invention and described in the present specification.

In one embodiment, the nonmagnetic filler contains colloidal particles. In the present invention and present specification, the term "colloidal particles" refers at least to particles capable of dispersing to form a colloidal dispersion without precipitating when added in a quantity of 1 g per 100 mL of an organic solvent in the form of at least one from among methyl ethyl ketone, cyclohexanone, toluene, ethyl acetate, or a mixed solvent of two or more of these solvents in any mixing ratio.

In one embodiment, the magnetic tape has a nonmagnetic layer containing nonmagnetic powder and binder between the nonmagnetic support and the magnetic layer.

A further aspect of the present invention relates to a method of manufacturing the above magnetic tape, including forming a magnetic layer, with the forming of a magnetic layer including:

coating a magnetic layer-forming composition containing ferromagnetic powder, binder, a curing agent, and solvent on a nonmagnetic support, either directly or over another layer to form a coating layer;

heating and drying the coating layer by a heat treatment; and curing the coating layer by subjecting the coating layer to a curing treatment;

with cooling the coating layer after the coating but before the heating and drying, and burnishing the surface of the coating layer after the heating and drying but before the curing.

In one embodiment, the cooling is conducted by placing the coating layer in a cooling atmosphere ranging from −10° C. to 0° C.

In one embodiment, the solvent that is contained in the magnetic layer-forming composition contains ketone solvent.

In one embodiment, the curing agent is a thermosetting compound and the curing is conducted by a heat treatment.

In one embodiment, the thermosetting compound is polyisocyanate.

In one embodiment, surface-smoothing is conducted after the burnishing but before the curing.

An aspect of the present invention can provide a magnetic tape exhibiting good electromagnetic characteristics and little drop in reproduction output with repeated running.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
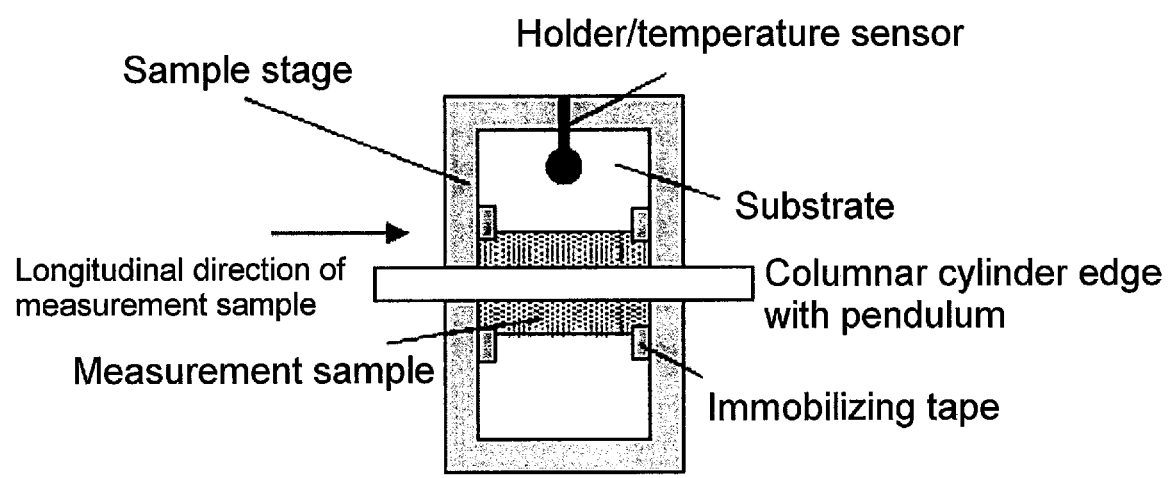
FIG. 1 is a descriptive drawing of the method of measuring the logarithmic decrement.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a magnetic tape having a magnetic layer containing ferromagnetic powder and binder on a nonmagnetic support, the centerline average surface roughness (also referred to as the "magnetic tape surface roughness" hereinafter) Ra of which as measured on the surface on the magnetic layer side of the magnetic tape is less than or equal to 1.8 nm, and the logarithmic decrement as determined by a pendulum viscoelasticity test on the surface on the magnetic layer side of the magnetic tape (also referred to simply as the "logarithmic decrement" hereinafter) is less than or equal to 0.050.

The above magnetic tape will be described in detail below.

[Magnetic Tape Surface Roughness Ra]

The centerline average surface roughness (magnetic tape surface roughness) Ra as measured on the surface on the magnetic layer side of the magnetic tape is less than or equal to 1.8 nm. This can allows the magnetic tape to exhibit good electromagnetic characteristics. From the perspective of further enhancing the electromagnetic characteristics, the magnetic tape surface roughness Ra is desirably less than or equal to 1.7 nm, preferably less than or equal to 1.6 nm, and more preferably, less than or equal to 1.5 nm. By way of example, the magnetic layer surface roughness Ra can be greater than or equal to 1.2 nm. However, from the perspective of enhancing the electromagnetic characteristics, the magnetic tape surface roughness Ra is desirably low, and can thus fall below this level.

The centerline average surface roughness (magnetic tape surface roughness) Ra measured on the surface on the magnetic layer side of the magnetic tape as referred to in the present invention and the present specification refers to the centerline average surface roughness Ra as measured in a region with an area of 40 μm×40 μm at any position on the surface on the magnetic layer side of the magnetic tape by atomic force microscope (AFM). An example of an atomic force microscope that can be employed is the Nanoscope 4 made by Veeco. In Examples set forth further below, Nanoscope 4 made by Veeco was employed at a scan rate (probe displacement rate) of 40 μm/s and a resolution of 512 pixels×512 pixels to measure the magnetic tape surface roughness Ra.

The magnetic tape surface roughness Ra can be controlled by known methods. For example, the magnetic tape surface roughness Ra can be varied by means of the size of the various powders contained in the magnetic layer (such as the ferromagnetic powder and any nonmagnetic fillers optionally incorporated into the magnetic layer), the manufacturing conditions, and the like. Thus, a magnetic tape having a magnetic tape surface roughness Ra of less than or equal to 1.8 nm can be obtained by adjusting one or more of the above.

[Logarithmic Decrement]

The logarithmic decrement determined by a pendulum viscoelasticity test on the surface on the magnetic layer side of the magnetic tape is less than or equal to 0.050. Thus, the drop in reproduction output with repeated running can be inhibited in a magnetic tape having a magnetic tape surface roughness Ra falling within the above-stated range. From the perspective of further inhibiting the drop in reproduction output, the logarithmic decrement is desirably less than or equal to 0.045, preferably less than or equal to 0.040. From the perspective of inhibiting the drop in reproduction output, the lower the logarithmic decrement, the better. Thus, no lower limit is specifically established. For example, the logarithmic decrement can be greater than or equal to 0.010, or greater than or equal to 0.015, but can also fall below these values. Specific ways of adjusting the logarithmic decrement will be described further below.

In the present invention and present specification, the term "logarithmic decrement" is a value determined by the following method.

Figure 2:
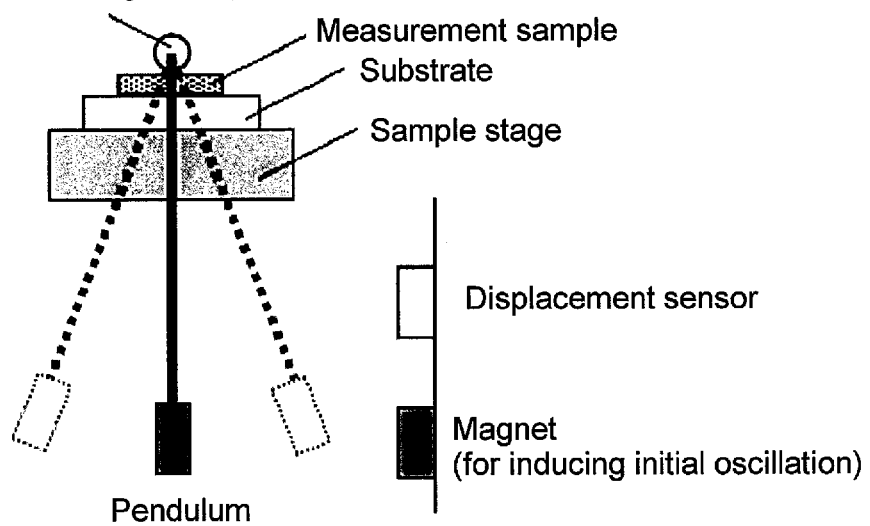
FIG. 2 is a descriptive drawing of the method of measuring the logarithmic decrement.
Figure 3:
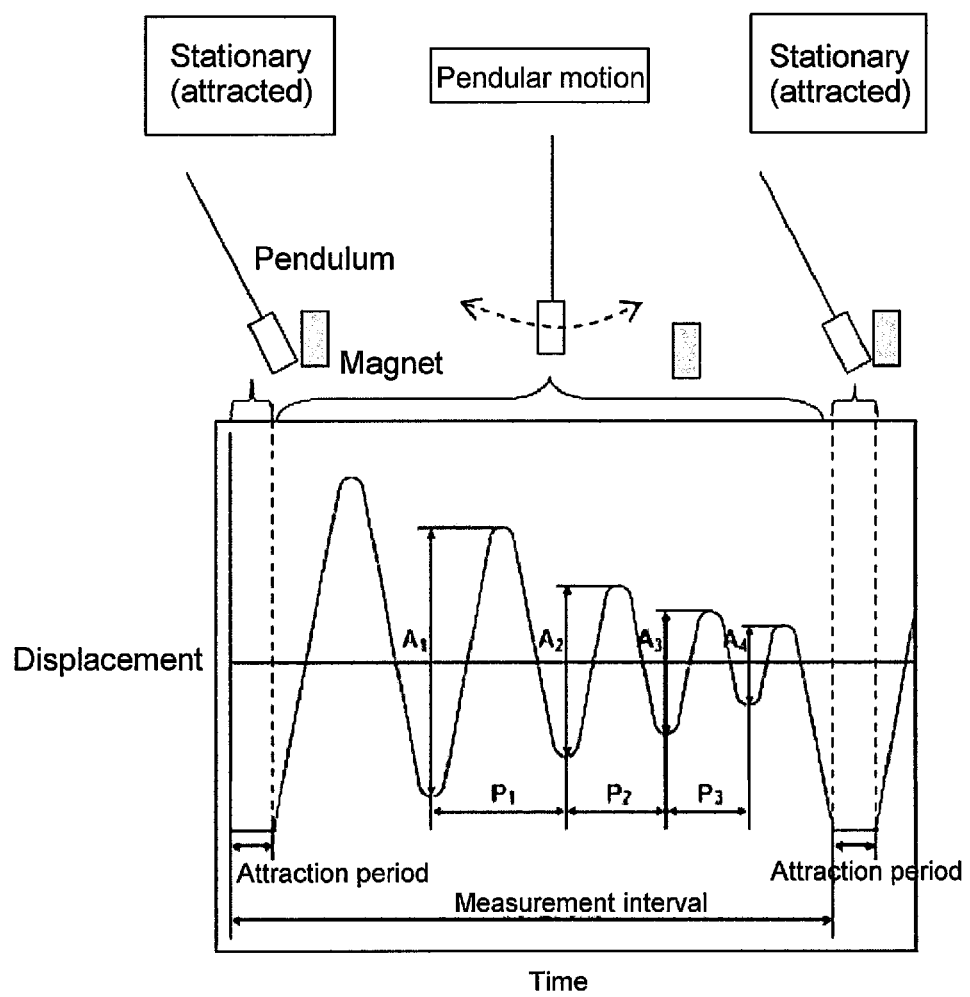
FIG. 3 is a descriptive drawing of the method of measuring the logarithmic decrement.

FIGS. 1 to 3 are descriptive drawings of the method of measuring the logarithmic decrement. The method of measuring the logarithmic decrement will be described below with reference to these figures. However, the forms shown in the figures are examples, and do not limit the present invention in any way.

A measurement sample is cut out of the magnetic tape to be measured. The measurement sample that has been cut out is placed with the measurement surface (surface on the magnetic layer side) facing upward on a substrate in a pendulum viscoelasticity tester, and is secured with immobilizing tape or the like in a state with no visibly apparent wrinkles.

The columnar cylinder edge (4 mm in diameter) equipped with a pendulum 13 g in weight is disposed on the measurement surface of the measurement sample such that the long axis direction of the columnar cylinder edge runs parallel to the longitudinal direction of the measurement sample. An example of the columnar cylinder edge equipped with a pendulum positioned (as viewed from above) on the measurement surface of a measurement sample in this manner is shown in FIG. 1. In the form shown in FIG. 1, a holder/temperature sensor is positioned in a configuration permitting monitoring of the substrate surface temperature. However, this configuration is not essential. The longitudinal direction of the measurement sample refers to the longitudinal direction of the magnetic tape out of which the measurement sample has been cut. The angles such as "parallel" that are referred to in the present specification may include the range of error that is permitted in the technical field to which the present invention belongs. For example, they mean falling within a range of less than ±10° of the precise angle. The error relative to the precise angle is desirably less than or equal to 5°, preferably less than or equal to 3°. The pendulum employed is made of a material having the property of being drawn by a magnet, such as a metal, alloy, or the like.

The surface temperature of the substrate on which the measurement sample has been positioned is raised at a rate of less than or equal to 5° C./min (any rate of increase less than or equal to 5° C./min will do) up to 80° C., and movement of the pendulum is begun (initial oscillation is induced) by removing the attraction between pendulum and magnet. FIG. 2 shows an example of how the pendulum moves (a lateral view). In the form shown in FIG. 2, within the pendulum viscoelasticity tester, the passage of electricity to the magnetic (electromagnet) positioned beneath the sample stage is halted (the switch is turned off) to remove the attraction, thereby causing the pendulum to begin to move. When electricity is restored to the electromagnetic (the switch is turned on), the pendulum is drawn by the magnetic, stopping movement of the pendulum. During movement of the pendulum, as shown in FIG. 2, the pendulum oscillates repeatedly. While the pendulum is oscillating repeatedly, the displacement of the pendulum is monitored by a displacement sensor. Based on the results obtained, a displacement-time curve is obtained by plotting the displacement on the Y-axis and time on the X-axis. FIG. 3 shows an example of a displacement-time curve. The correlation between the status of the pendulum and the displacement-time curve is schematically shown in FIG. 3. During a given measurement interval, stationary (attraction) and pendular motion are repeated. Using a displacement-time curve obtained for a measurement interval of greater than or equal to 10 minutes (any period greater than or equal to 10 minutes will do), the logarithmic decrement $\Delta$ (no unit) is obtained from the equation given below. The value obtained is adopted as the logarithmic decrement of the surface on the magnetic layer side of the magnetic tape. One attraction period is made greater than or equal to 1 second (any period greater than or equal to 1 second will do), and the period from the end of one attraction to the start of the next attraction is made greater than or equal to 6 seconds (any period greater than or equal to 6 seconds will do). The measurement interval refers to the interval from the start of one attraction to the start of the next attraction. The humidity of the environment in which pendular motion is conducted can be any relative humidity falling within a range of 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, the interval from one minimum displacement to the next minimum displacement is adopted as one wave period. The number of waves contained in the displacement-time curve during one measurement interval is denoted by n, and the difference between the minimum displacement and the maximum displacement of the $n^{th}$ wave is denoted by An. In FIG. 3, the interval from the minimum displacement of the $n^{th}$ wave to the next minimum is denoted as Pn (for example, $P_1$ for the 1st wave, $P_2$ for the second, $P_3$ for the third). The logarithmic decrement is calculated using the difference between the next minimum displacement and maximum displacement of the $n^{th}$ wave ($A_{n+1}$ in the above equation, $A_4$ in the displacement-time curve shown in FIG. 3). However, the portion during which the pendulum is stationary (attracted) following the maximum is not employed in counting the number of waves. Nor is the portion during which the pendulum is stationary (attracted) before the maximum displacement used to count the number of waves. Accordingly, in the displacement-time curve shown in FIG. 3, the number of waves is 3 (n=3).

The present inventors presume the following regarding the logarithmic decrement. However, the following is merely presumption, and is not intended to limit the present invention in any way.

As set forth above, it is possible to enhance the electromagnetic characteristics by increasing the smoothness of the surface of the magnetic tape. However, when the surface smoothness is increased, the contact area (so-called "actual contact area") between the head and the surface of the magnetic tape during running is thought to increase. As a result, components derived from the magnetic tape tend to adhere to the head from the surface of the magnetic tape. The present inventors presume that as these components repeatedly adhere to the head and accumulate during running, they impart a spacing loss which in turn causes a drop in reproduction output.

Accordingly, the present inventors conducted further extensive research into how to reduce the quantity of components derived from the magnetic tape that adhere to the head and accumulate. As a result, they found the above logarithmic decrement to be an indicator of the quantity of components that adhere to the head and accumulate, and discovered that by keeping its value to less than or equal to 0.050, it was possible to inhibit the drop in reproduction output caused by repeated running.

With regard to the components that are derived from the magnetic tape and cause spacing loss, the present inventors presume that it is adhesive components which are released from the magnetic tape during running that adhere to the head and accumulate. Although the details regarding these adhesive components are unclear, the present inventors presume that they may be derived from the resin that is used as binder. A more detailed description follows. Various types of resin, which will be described in detail further below, can be employed as binder. The term "resin" refers to polymer (including homopolymer and copolymer) of two or more polymerizable compounds, and normally includes compounds the molecular weight of which falls below the average molecular weight (referred to as "low molecular weight binder components" hereinafter). The present inventors presume that such low molecular weight binder components are released from the magnetic tape during running, adhere to the head, and accumulate with repeated running, thereby causing the spacing loss that in turn lowers reproduction output. These low molecular weight binder components are thought to be adhesive. The present inventors presume that the logarithmic decrement obtained by a pendulum viscoelasticity test to be an indicator of the quantity of components adhering to and accumulating on the head during running. In one embodiment, the magnetic layer is formed by coating a magnetic layer-forming composition containing a curing agent in addition to ferromagnetic powder and binder, either directly or over another layer, and conducting a curing treatment. The present inventors presume that this curing treatment causes the binder and curing agent to undergo a curing reaction (crosslinking reaction), and that the low molecular weight binder components are poor in reactivity in the curing reaction, although the reason for this has yet to be determined. Thus, the low molecular weight binder components tend not to build up in the magnetic layer, are released from the magnetic layer, and tend to adhere to the head. The present inventors presume this to be one reason for which low molecular weight binder components adhere to and build up on the head during running.

However, the above is merely a presumption by the present inventors, and is not intended to limit the present invention in any way.

The above magnetic tape will be described in greater detail below.

[Magnetic Layer]
<Ferromagnetic Powder>

The magnetic layer contains ferromagnetic powder and binder. Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present Specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. A high fill rate is desirable from the perspective of increasing recording density.

<Binder, Curing Agent>

The above magnetic tape is a particulate magnetic tape. The magnetic layer contains ferromagnetic powder and binder. The various resins that are commonly employed as binders in particulate magnetic recording media can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the nonmagnetic layer and backcoat layer described further below. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 10,000 and less than or equal to 200,000 as a weight average molecular weight. The weight average molecular weight in the present invention and present specification is a value that is obtained by measurement by gel permeation chromatography (GPC) and converted to a polystyrene equivalent. Examples of measurement conditions are given below. The weight average molecular weights given in Examples further below are values obtained by measurement under the following measurement conditions and converted to polystyrene equivalents.

GPC device: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing coating strength, a curing agent can be added in a quantity of 50.0 to 80.0 weight parts for use.

<Additives>

As needed, one or more additives can be incorporated into a magnetic layer containing ferromagnetic powder and binder. An example of additives is the above curing agent. At least a portion of the curing agent can be contained into the magnetic layer in a state of having reacted (having crosslinked with) another component such as binder by causing a curing reaction to progress in the magnetic layer-forming process. Examples of additives that can be incorporated into the magnetic layer are nonmagnetic fillers, lubricants, dispersing agents, dispersion adjuvants, antifungal agents, antistatic agents, oxidation inhibitors, and carbon black. The additives can be used by suitably selecting commercial products based on the properties desired.

Nonmagnetic fillers, which are one form of additive, will be described below. However, the present invention is not limited to the embodiments given below.

(Nonmagnetic Fillers)

One or more nonmagnetic fillers are desirably incorporated into the magnetic layer. Examples of nonmagnetic fillers are nonmagnetic fillers that are capable of functioning as protrusion-forming agents that form protrusions that suitably protrude from the surface of the magnetic layer (referred to hereinafter as "protrusion-forming agents") and nonmagnetic fillers capable of functioning as abrasives (referred to hereinafter as "abrasives"). The protrusion-forming agents are components that can contribute to controlling the frictional characteristics of the surface of the magnetic layer. In the magnetic layer of the above magnetic tape, it is desirable for at least either a protrusion-forming agent or an abrasive to be incorporated, and preferable for both to be incorporated.

The protrusion-forming agent can be employed in the form of the various nonmagnetic fillers that are commonly employed as protrusion-forming agents. These can be inorganic or organic materials. In one embodiment, from the perspective of achieving uniform frictional characteristics, the particle size distribution of the protrusion-forming agents is desirably that of a monodispersion exhibiting a single peak, not that of a multidispersion exhibiting multiple distribution peaks. From the perspective of the availability of monodispersed particles, the nonmagnetic filler is desirably powder of an inorganic material. Examples of powders of inorganic materials are various powders such as metal oxides, metal carbonates, metal sulfates, metal nitrides, metal carbides, and metal sulfides. Powders of inorganic oxides are desirable. The protrusion-forming agent is preferably a colloidal particle, more preferably an inorganic oxide colloidal particle. From the perspective of the availability of monodispersed particles, the inorganic oxide constituting the inorganic oxide colloidal particle is desirably silicon dioxide (silica). The inorganic oxide colloidal particles are preferably colloidal silica (silica colloid particles). The average particle size of colloidal particles is a value obtained by the method described as the average particle diameter measuring method in Japanese Unexamined Patent Publication (KOKAI) No. 2011-048878, paragraph 0015. In another embodiment, the protrusion-forming agent is desirably carbon black.

The average particle size of the protrusion-forming agent is, for example 30 nm to 300 nm, desirably 40 nm to 200 nm.

Examples of abrasives are those commonly employed as abrasives in the magnetic layer, such as powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, alumina powders such as α-alumina and silicon carbide powders are desirable. The particle size of the abrasive, given as the specific surface area—an indicator of particle size—is, for example, greater than or equal to 14 $m^2/g$, desirably greater than or equal to 16 $m^2/g$, and more preferably, greater than or equal to 18 $m^2/g$. The specific surface area of the abrasive can be less than or equal to 40 $m^2/g$, for example. The specific surface area is a value determined by the nitrogen adsorption method (also known as the single-point Brunauer-Emmett-Teller (BET) method) by the measurement of primary particles. The specific surface area obtained by this method will also be referred to as the BET specific surface area.

From the perspective of achieving better development of the various functions of the protrusion-forming agent and abrasive, the content of the protrusion-forming agent in the magnetic layer is desirably 1.0 to 4.0 weight parts, preferably 1.5 to 3.5 weight parts, per 100.0 weight parts of ferromagnetic powder. The content of the abrasive in the magnetic layer is desirably 1.0 to 20.0 weight parts, preferably 3.0 to 15.0 weight parts, and more preferably, 4.0 to 10.0 weight parts, per 100.0 weight parts of ferromagnetic powder.

Examples of additives that can be employed in a magnetic layer containing abrasives are the dispersing agents for enhancing the dispersion of abrasives described in Japanese Unexamined Patent Publication (KOKAI) No. 2013-131285, paragraphs 0012 to 0022. The content of the above publication is expressly incorporated herein by reference in its entirety.

[Nonmagnetic Layer]

The nonmagnetic layer will be described next. In the above magnetic tape, a magnetic layer can be present directly on the nonmagnetic support, or a magnetic layer can be present over at least one other layer on the nonmagnetic support. This other layer is desirably a nonmagnetic layer containing nonmagnetic powder and binder. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the above magnetic tape may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thickness of the Nonmagnetic Support, Thickness of the Various Layers]

The thickness of the nonmagnetic support and of the various layers in the above magnetic tape will be given below. The thickness of the nonmagnetic support is desirably 3.00 μm to 4.50 μm.

The thickness of the magnetic layer can be optimized based on the saturation magnetization of the magnetic head employed, the length of the head gap, and the bandwidth of the recording signal, and it can be generally 10 nm to 150 nm. From the perspective of higher density recording, it is desirably 20 nm to 120 nm, preferably 30 nm to 100 nm. It suffices for at least one magnetic layer to be present. It is also possible to divide the magnetic layer into two or more layers with differing magnetic characteristics. Known configurations of multilayer magnetic layers can be applied.

The thickness of the nonmagnetic layer is, for example, 0.01 μm to 3.00 μm, desirably 0.05 μm to 2.00 μm, and more preferably, 0.05 μm to 1.50 μm.

[Backcoat Layer]

A backcoat layer can be present on the opposite surface of the nonmagnetic support from the surface on which the magnetic layer is present. The backcoat layer contains nonmagnetic powder and binder. Either carbon black or inorganic powder, desirably both, can be incorporated as the nonmagnetic powder. The formula of the magnetic layer and the nonmagnetic layer can be applied to the binders and various additives for forming the backcoat layer. The thickness of the backcoat layer is desirably less than or equal to 0.90 μm, preferably 0.10 μm to 0.70 μm.

The thickness of the various layers and nonmagnetic support of the magnetic tape, as well as the total thickness, can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Manufacturing Process]

<Preparation of the Various Layer-Forming Compositions>

The compositions for forming the magnetic layer, nonmagnetic layer, and backcoat layer normally contain solvent in addition to the various components that have been set forth above. Examples of the solvent are the various organic solvents generally employed in the manufacturing of particulate magnetic recording media. Specific examples of solvents that can be employed are, in any proportions, acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexanone. Of these, from the perspective of solubility of the binders commonly employed in particulate magnetic recording media, one or more ketone solvents are desirably incorporated into the magnetic layer-forming composition. The quantity of solvent in the magnetic layer-forming composition is not specifically limited. The quantity can be the usual quantity in the magnetic layer-forming composition of a particulate magnetic recording medium.

The description given above also applies to the solvents employed in the various layer-forming compositions, such as the nonmagnetic layer-forming composition and the like.

The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, binder, nonmagnetic powder, various optionally added additives, solvent, and the like that are employed in the present invention can be added at the start, or part way through, any of these steps. An individual starting material can be divided for addition in two or more steps. For example, it is possible to separately disperse the abrasive from the ferromagnetic powder in preparing the magnetic layer-forming composition. Separate dispersion is desirable. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter (diameter of beads) and fill rate of these dispersion beads can be optimized for use. A known disperser can be employed.

<Coating Step, Cooling Step, Heating and Drying Step, Burnishing Step, Curing Step>

The magnetic layer can be formed by directly coating the magnetic layer-forming composition on a nonmagnetic support, and is desirably formed by sequentially or simultaneously coating it with the nonmagnetic layer-forming composition. Reference can be made to Japanese Unexamined Patent Publication (KOKAI) No. 2010-231843, paragraph 0066, for details regarding coatings to form the various layers. The content of the above publication is expressly incorporated herein by reference in its entirety.

In one desirable embodiment, the above magnetic tape is manufactured by a manufacturing method including a magnetic layer-forming process, with the magnetic layer-forming process including:

a coating step of forming a coating layer by coating a magnetic layer-forming composition containing ferromagnetic powder, binder, a curing agent, and solvent on a nonmagnetic support, either directly or over another layer;

a heating and drying step of drying the coating layer by a heat treatment; and a curing step of subjecting the coating layer to a curing treatment;

with a cooling step of cooling the coating layer being incorporated between the coating step and the heating and drying step, and a burnishing step of burnishing the surface of the coating layer being incorporated between the heating and drying step and the curing step.

The present inventors presume that implementing a cooling step and a burnishing step in the magnetic layer forming process of the above manufacturing method is a desirable way to keep the above-described logarithmic decrement to less than or equal to 0.050. The details are as follows.

The present inventors presume that conducting a cooling step of cooling the coating layer between the coating step and the heating and drying step can contribute to causing the adhesive components released by the magnetic tape during running to become locally present on the surface and/or in the portion of the outer layer in proximity to the surface of the coating layer. Although the reasons for this are unclear, the present inventors presume that cooling the coating layer of the magnetic layer-forming composition before the heating and drying step can facilitate migration of adhesive components to the surface and/or outer layer portion of the coating layer during volatilization of the solvent in the heating and drying step. The present inventors presume that burnishing the surface of the coating layer on the surface of which, and/or in the outer layer portion of which, the adhesive components are locally present can remove the adhesive components. The present inventors presume that conducting a curing step after having removed the adhesive components in this manner can relate to keeping the logarithmic decrement to less than or equal to 0.050. However, these are merely presumptions, and are not intended to limit the present invention in any way.

That is, an aspect of the present invention relates to a method of manufacturing the above magnetic tape, including a magnetic layer-forming process, with the magnetic layer-forming process including:

a coating step of forming a coating layer by coating a magnetic layer-forming composition containing ferromagnetic powder, binder, a curing agent, and solvent on a nonmagnetic support, either directly or over another layer;

a heating and drying step of drying the coating layer by a heat treatment; and a curing step of subjecting the coating layer to a curing treatment;

with a cooling step of cooling the coating layer being incorporated between the coating step and the heating and drying step, and a burnishing step of burnishing the surface of the coating layer being incorporated between the heating and drying step and the curing step.

As set forth above, the magnetic layer-forming composition can be multilayer coated sequentially or simultaneously with the nonmagnetic layer-forming composition. In a desirable embodiment, the magnetic tape can be manufactured by sequential multilayer coating. The nonmagnetic layer is formed by coating the nonmagnetic layer-forming composition on a nonmagnetic support to form a coating layer in a coating step, and heating the coating layer that has been formed to dry it in a heating and drying step. The magnetic layer is then formed by coating the magnetic layer-forming composition over the nonmagnetic layer that has been formed to form a coating layer in a coating step, and heating the coating layer that has been formed to dry it in a heating and drying step.

A specific embodiment of the above manufacturing method will be described below based on FIG. 4. However, the present invention is not limited by the specific embodiment set forth below.

Figure 4:
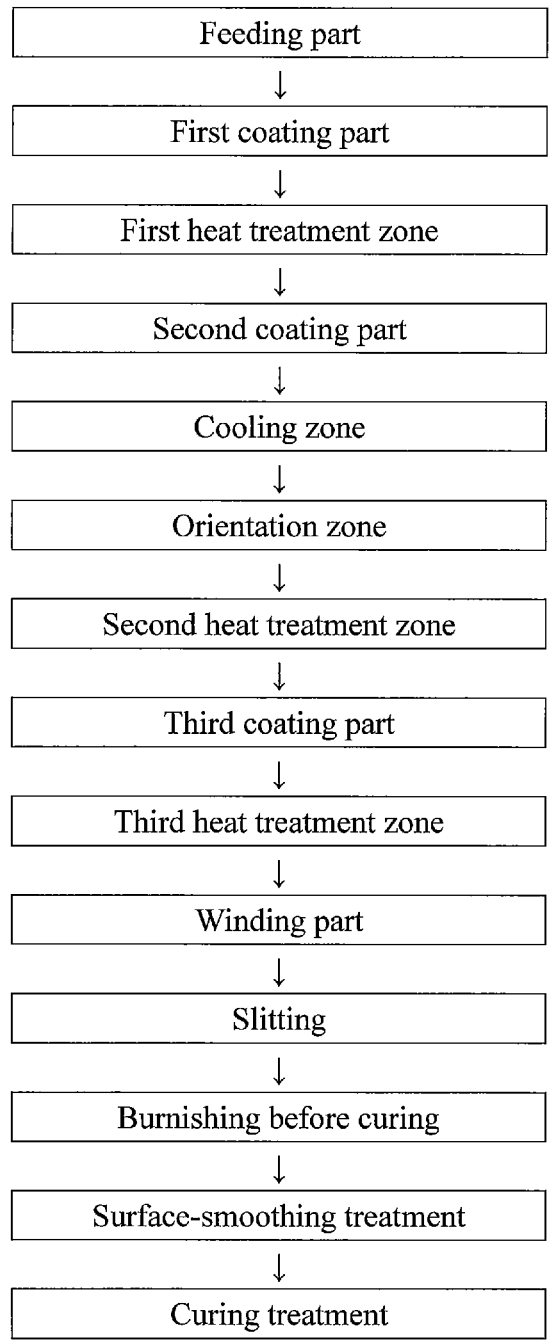
FIG. 4 is an example (process schematic) of a specific form of the magnetic tape manufacturing process.

FIG. 4 is a process schematic showing a specific embodiment of the process of manufacturing a magnetic tape having on one surface of a nonmagnetic support a nonmagnetic layer and a magnetic layer, in that order, and having a backcoat layer on the other surface thereof. In the embodiment shown in FIG. 4, the operations of feeding a nonmagnetic support (elongated film) from a feeding part and winding it up on a winding part are continuously conducted. By means of various processes such as coating, drying, and orienting that are conducted by the various parts and in the various zones shown in FIG. 4, a nonmagnetic layer and magnetic layer are formed by sequential multilayer coating on one surface of a running nonmagnetic support, and a backcoat layer is formed on the other surface thereof. With the exceptions that a cooling zone is incorporated into the magnetic layer-forming process and a burnishing step is incorporated before curing, the process can be conducted in the normal fashion for manufacturing particulate magnetic recording media.

The nonmagnetic layer-forming composition is coated in a first coating part on the nonmagnetic support that is fed by the feeding part (nonmagnetic layer-forming composition coating step).

Following the coating step, the coating layer of the nonmagnetic layer-forming composition that has been formed by the coating step is heated to dry it in a first heating zone (heating and drying step). The heating and drying can be conducted by causing the nonmagnetic support on which is present a coating layer of the nonmagnetic layer-forming composition through a hot atmosphere. The temperature of the hot atmosphere is, for example, 60° C. to 140° C.; a temperature capable of drying the coating layer by volatizing the solvent will suffice, and there is no limitation to within this range. It is also possible to optionally blow a heated gas onto the surface of the coating layer. The above can be applied for the heating and drying step in the second heating zone and the heating and drying step in the third heating zone, described further below.

Next, in the second coating part, the magnetic layer-forming composition is coated on the nonmagnetic layer that has been formed by the heating and drying step in the first heating zone (magnetic layer-forming composition coating step).

Following the above coating step, the coating layer of the magnetic layer-forming composition that has been formed by the coating step is cooled in a cooling zone (cooling step). For example, the cooling step can be conducted by passing the nonmagnetic support, on which the above coating layer has been formed over the nonmagnetic layer, through a cold atmosphere. The temperature of the cold atmosphere desirably falls within a range of −10° C. to 0° C., and preferably falls within a range of −5° C. to 0° C. The duration of the cooling step (for example, the period from when the some portion of the coating layer is conveyed into the cooling zone to when it is conveyed out (also referred to as the "residence period" hereinafter) is not specifically limited. The longer it is, the lower the value of the logarithmic decrement tends to be. It is desirable to respond to the requirement of achieving a logarithmic decrement of less than or equal to 0.050, if necessary, by conducting preliminary tests and making adjustments. It is also possible to blow a cold gas onto the surface of the coating layer in the cooling step.

Subsequently, while the coating layer of the magnetic layer-forming composition is still wet, an orientation treatment is conducted on the ferromagnetic powder in the coating layer in the orientation zone. Reference can be made to Japanese Unexamined Patent Publication (KOKAI) No. 2010-231843, paragraph 0067, with regard to the orientation treatment.

Following the orientation treatment, the coating layer is subjected to a heating and drying step in a second heating zone.

Next, in a third coating part, a coating layer is formed by coating the backcoat layer-forming composition on the surface on the opposite side of the nonmagnetic support from the surface on which the nonmagnetic layer and magnetic layer have been formed (backcoat layer-forming composition coating step). Subsequently, the coating layer is heated and dried in a third heating zone.

In this manner, it is possible to obtain a magnetic tape having a coating layer of a magnetic layer-forming composition that has been heat-dried over a nonmagnetic layer on one surface of a nonmagnetic support, and having a backcoat layer on the other surface thereof. The magnetic tape obtained here will become a finished magnetic tape after being subjected to various processing, described further below.

The magnetic tape that has been obtained is wound on a winding part and then cut (slit) to the size of a finished magnetic tape. A known slitting apparatus can be used to conduct the slitting.

Prior to subjecting the magnetic tape that has been slit to a curing treatment (heating, irradiation with light, or the like) based on the type of curing agent that is contained in the magnetic layer-forming composition, the surface of the coating layer of the magnetic layer-forming composition that has been heated and dried is subjected to burnishing (burnishing step between the heating and drying step and the curing step). The present inventors presume that this removal by burnishing treatment of the adhesive components that have been made to migrate to the surface and outer layer portion of the coating layer by cooling in the cooling zone can be related to keeping the logarithmic decrement to less than or equal to 0.050. However, as set forth above, this is merely a presumption, and is not intended to limit the present invention in any way.

In the burnishing treatment, the surface that is being treated is rubbed with a material (such as a polishing tape or a grinding apparatus such as a grinding blade or grinding wheel). It can be conducted in the same manner as a burnishing treatment known to be used in manufacturing particulate magnetic recording media. However, no burnishing treatment has conventionally been conducted before the curing step following a cooling step and a heating and drying step. By contrast, conducting a burnishing treatment at this stage can keep the logarithmic decrement to less than or equal to 0.050. This is a new discovery that has been made by the present inventors.

The burnishing treatment is desirably implemented by either rubbing with a polishing tape the surface of the coating layer being treated (polishing), or by grinding with a grinding apparatus the surface of the coating layer being treated (grinding), or by both. When the magnetic layer-forming composition contains an abrasive, it is desirable to employ a polishing tape containing at least one type of abrasive with a higher Mohs hardness than the abrasive. A polishing tape in the form of a commercial product can be employed, or a polishing tape fabricated by a known method can be employed. A grinding apparatus in the form of a known grinding blade, grinding wheel, or the like, such as a fixed blade, diamond wheel, or rotary blade, can be employed. The surface of the coating layer that has been rubbed with a polishing tape or ground with a grinding apparatus can be wiped with a wiping material. Reference can be made to Japanese Unexamined Patent Publication (KOKAI) Heisei No. 6-52544, paragraphs 0034 to 0048, FIG. 1, and Examples given in this publication, for details regarding desirable polishing tapes, grinding apparatus, burnishing treatments, and wiping treatments. The content of the above publication is expressly incorporated herein by reference in its entirety. The more intense the burnishing treatment adopted, the lower the value of the logarithmic decrement tends to be. The higher the degree of hardness of the abrasive contained in the polishing tape, the more the burnishing treatment can be intensified. The greater the quantity of abrasive in the polishing tape, the more the burnishing treatment can be intensified. And the higher the degree of hardness of the grinding apparatus that is employed, the more the burnishing treatment can be intensified. The greater the rate of sliding of the surface of the coating layer being treated against the member (such as a polishing tape or grinding apparatus), the more the burnishing treatment can be intensified. This sliding rate can be increased by increasing either the speed with which the member is displaced or the speed with which the magnetic tape being treated is displaced, or both.

Following the above burnishing treatment (burnishing step), the coating layer of the magnetic layer-forming composition is subjected to a curing treatment. In the embodiment shown in FIG. 4, the coating layer of the magnetic layer-forming composition is subjected to a surface smoothing treatment after the burnishing treatment and before the curing treatment. The surface smoothing treatment is desirably conducted by means of a calendering treatment. For example, reference can be made to Japanese Unexamined Patent Publication (KOKAI) No. 2010-231843, paragraph 0026, for details regarding the calendering treatment. The more intense the calendering treatment employed, the smoother the surface of the magnetic tape, and thus the lower the value of the centerline average surface roughness Ra measured on the surface on the magnetic layer side of the magnetic tape. The higher the temperature of the surface of the calender rolls (calender temperature) and the greater the calender pressure in the calender treatment, the more intense the treatment.

Subsequently, the coating layer of the magnetic layer-forming composition is subjected to a curing treatment based on the type of curing agent contained in the coating layer (curing step). The curing treatment can be conducted based on the type of curing agent contained in the coating layer, such as in the form of a heat treatment or irradiation with light. The curing treatment conditions are not specifically limited, and can be suitably set based on the formula of the magnetic layer-forming composition employed to form the coating layer, the type of curing agent, the thickness of the coating layer, and the like. For example, when a coating layer has been formed with a magnetic layer-forming composition containing a curing agent in the form of polyisocyanate, the curing treatment is desirably a heat treatment. When a curing agent is contained in a layer other than the magnetic layer, the curing reaction of that layer can be advanced by the curing treatment set forth here. Alternatively, a separate curing step can be provided. It is also possible to conduct another burnishing treatment following the curing step.

It is possible to obtain a magnetic tape having on one surface of a nonmagnetic support a nonmagnetic layer and a magnetic layer in that order, and a backcoat layer on the other surface thereof, such that the centerline average surface roughness Ra as measured on the surface on the magnetic layer side is less than or equal to 1.8 nm, and the logarithmic decrement determined by a pendulum viscoelasticity test on the surface on the magnetic layer side of the magnetic tape is less than or equal to 0.050.

However, the manufacturing method set forth above is merely an example. A logarithmic decrement of less than or equal to 0.050 can be achieved by any means permitting adjustment of the logarithmic decrement, and such embodiments are also covered by the present invention.

EXAMPLES

The present invention will be described in greater detail below through Examples. However, the present invention is not limited to the embodiments shown in Examples. The "parts" and "percent (%)" indicated below denote "weight parts" and "weight percent (%)".

Examples 1 to 12, Comparative Examples 1 to 16

1. Preparation of Alumina Dispersion

To 100.0 parts of alumina powder with an alpha conversion rate of 65% and a BET specific surface area of 20 m$^2$/g (HIT-80, made by Sumitomo Chemical Co., Ltd.) were admixed 3.0 parts of 2,3-dihydroxynaphthalene (made by Tokyo Chemical Industry Co., Ltd.), 31.3 parts of a 32% solution (in a mixed solvent of methyl ethyl ketone and toluene) of polyester polyurethane resin (UR-4800 made by Toyobo (Japanese registered trademark) containing polar groups in the form of SO$_3$Na (polar group content: 80 meq/kg)), and 570.0 parts of solvent in the form of a 1:1 (by weight) mixed solution of methyl ethyl ketone and cyclohexanone. The mixture was then dispersed for 5 hours in a paint shaker in the presence of zirconia beads. Following dispersion, the dispersion and beads were separated with a mesh, yielding an alumina dispersion.

2. Formula of Magnetic Layer-Forming Composition

| (Magnetic liquid) | |
|---|---|
| Ferromagnetic powder: see Table 1 | 100.0 parts |
| SO$_3$Na group-containing polyurethane resin (weight average molecular weight: 70,000, SO$_3$Na groups: 0.2 meq/g) | 14.0 parts |
| Cyclohexanone | 150.0 parts |
| Methyl ethyl ketone | 150.0 parts |
| (Abrasive liquid) | |
| Alumina dispersion prepared in 1. above | 6.0 parts |
| (silica sol) | |
| Colloidal silica (colloidal silica particles meeting the above definition) Average particle size: see Table 1 | 2.0 parts |
| Methyl ethyl ketone | 1.4 parts |
| (Other components) | |
| Stearic acid | 2.0 parts |
| Amide stearate | 0.2 part |
| Butyl stearate | 2.0 parts |
| Polyisocyanate (Coronate (Japanese registered trademark) L made by Nippon Polyurethane Industry Co., Ltd.) | 2.5 parts |
| (Finishing solvents) | |
| Cyclohexanone | 200.0 parts |
| Methyl ethyl ketone | 200.0 parts |

In Table 1, BF denotes ferromagnetic hexagonal barium ferrite powder with an average particle size (average plate diameter) of 21 nm and MP denotes ferromagnetic metal powder with an average particle size (average major axis length) of 30 nm.

3. Formula of Nonmagnetic Layer-Forming Composition

| Nonmagnetic inorganic powder: α-iron oxide Average particle size (average major axis length): 0.15 μm Average acicular ratio: 7 BET specific surface area: 52 m$^2$/g | 100.0 parts |
|---|---|
| Carbon black Average particle size: 20 nm | 20.0 parts |
| Vinyl chloride copolymer | 13.0 parts |
| SO$_3$Na group-containing polyurethane resin (weight average molecular weight: 70,000, SO$_3$Na groups: 0.2 meq/g) | 9.0 parts |
| Phenylphosphonic acid | 3.0 parts |
| Stearic acid | 2.0 parts |
| Amide stearate | 0.2 part |
| Butyl stearate | 2.0 parts |
| Cyclohexanone | 300.0 parts |
| Methyl ethyl ketone | 300.0 parts |

4. Formula of Backcoat Layer-Forming Composition

| Nonmagnetic inorganic powder: α-iron oxide Average particle size (average major axis length): 0.15 μm Average acicular ratio: 7 BET specific surface area: 52 m$^2$/g | 80.0 parts |
|---|---|
| Carbon black Average particle size: 20 nm | 20.0 parts |
| Vinyl chloride copolymer | 13.0 parts |
| SO$_3$Na group-containing polyurethane resin | 6.0 parts |
| Phenylphosphonic acid | 3.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 355.0 parts |

5. Preparation of Various Layer-Forming Compositions

A magnetic layer-forming composition was prepared by the following method. The above magnetic liquid was prepared by dispersing (bead dispersing) the various components in a batch-type vertical sand mill for 24 hours. Zirconia beads with a bead diameter of 0.1 mmΦ were employed as dispersing beads. Using this sand mill, the magnetic liquid that had been prepared and the abrasive liquid were admixed with the other components (silica sol, other components, finishing solvents) and the mixture was bead dispersed for 5 minutes. The mixture was then processed for 0.5 minutes (ultrasonic dispersion) in a batch-type ultrasonic device (20 kHz, 300 W). Subsequently, a filter with an average pore diameter of 0.5 μm was employed to filter the mixture, yielding a magnetic layer-forming composition.

A nonmagnetic layer-forming composition was prepared by the following method. Excluding the lubricants (stearic acid, amide stearate, butyl stearate), cyclohexanone, and methyl ethyl ketone, the various components were dispersed for 24 hours in a batch-type vertical sand mill to obtain a dispersion. Zirconia beads with a bead diameter of 0.1 mmΦ were employed as dispersing beads. Subsequently, the remaining components were added to the dispersion that had been obtained and the mixture was stirred in a dissolver. The dispersion thus obtained was filtered with a filter having an average pore diameter of 0.5 μm, yielding a nonmagnetic layer-forming composition.

A backcoat layer-forming composition was prepared by the following method. Excluding the lubricants (stearic acid and butyl stearate), polyisocyanate, and cyclohexanone, the various components were kneaded and diluted in an open kneader. Subsequently, in a horizontal bead mill dispersing device, 12 passes of dispersion processing were conducted, each pass having a residence time of 2 minutes, using zirconia beads with a bead diameter of 1 mmΦ at a bead fill rate of 80 volume % and a rotor tip peripheral speed of 10 m/s. Subsequently, the remaining components were added to the dispersion that had been obtained and the mixture was stirred in a dissolver. The dispersion thus obtained was filtered with a filter having an average pore diameter of 1 μm, yielding a backcoat layer-forming composition.

6. Fabricating Magnetic Tapes

Magnetic tapes were fabricated based on the specific embodiment shown in FIG. 4. This will be described in detail.

A polyethylene naphthalate support 4.50 μm in thickness was fed from a feeding part. The nonmagnetic layer-forming composition prepared in 5. above was coated on one surface thereof in a quantity calculated to yield a dry thickness of 0.40 μm in a first coating part, and drying was conducted in a first heat treatment zone (atmospheric temperature 100° C.) to form a coating layer.

Subsequently, the magnetic layer-forming composition prepared in 5. above was coated over the nonmagnetic layer in a quantity calculated to yield a dry thickness of 60 nm in a second coating part to form a coating layer. While the coating layer that had been formed was still wet, a cooling step was conducted by passage through a cooling zone adjusted to an atmospheric temperature of 0° C. for the residence time indicated in Table 1. A perpendicular orientation treatment was also conducted by applying a magnetic field with a magnetic field strength of 0.3 T perpendicularly in an orientation zone, after which the coating layer was dried in a second heat treatment zone (atmospheric temperature 100° C.) having an atmospheric temperature of 100° C.

Subsequently, in a third coating part, the backcoat layer-forming composition prepared in 5. above was coated in a quantity calculated to yield a dry thickness of 0.60 m on the opposite surface of the polyethylene naphthalate support from that on which the nonmagnetic layer and magnetic layer had been formed to form a coating layer. The coating layer that had been formed was dried in a third heat treatment zone (atmospheric temperature 100° C.).

The magnetic tape thus obtained was slit to ½ inch (0.0127 meter) width. The surface of the coating layer of the magnetic layer-forming composition was then subjected to a burnishing treatment and a wiping treatment. In the burnishing and wiping treatments, in a processing device configured as set forth in FIG. 1 of Japanese Unexamined Patent Publication (KOKAI) Heisei No. 6-52544, a commercial polishing tape (product name MA22000; made by FUJIFILM; abrasive: diamond/$Cr_2O_3$/red iron oxide) was employed as the polishing tape, a commercial sapphire blade (5 mm in width, 35 mm in length, 60 degree tip angle, made by Kyocera Corp.) was employed as the grinding blade, and a commercial wiping material (product name WRP736 made by Kuraray Co., Ltd.) was employed as the wiping material. The processing conditions of Example 12 in Japanese Unexamined Patent Publication (KOKAI) Heisei No. 6-52544 were adopted as the processing conditions.

Following the above burnishing and wiping treatments, a calendering treatment (surface smoothing treatment) was conducted with a calender comprised solely of metal rolls at a speed of 80 m/minute, a linear pressure of 300 kg/cm, and the calender temperature indicated in Table 1 (surface temperature of calender rolls).

Subsequently, a curing treatment (heat treatment) was conducted for 36 hours in an environment of an atmospheric temperature of 70° C. to obtain a magnetic tape.

In Table 1, in those Comparative Examples for which "Not implemented" is indicated in the cooling zone residence time column, magnetic tapes were fabricated by a manufacturing process that did not include a cooling zone.

In Table 1, in those Comparative Examples for which "Not implemented" is indicated in the burnishing treatment before curing step column, magnetic tapes were fabricated by a manufacturing process in which neither a burnishing treatment nor a subsequent wiping treatment were conducted in the steps before implementing the curing treatment set forth above.

In Table 1, in Examples 8 to 10 and the Comparative Examples for which "Implemented" is indicated in the burnishing treatment after curing treatment column, the above-described burnishing treatment and wiping treatment were implemented in steps after implementation of the curing treatment. In Comparative Example 7, the above-described burnishing treatment and wiping treatment were continuously repeated 10 times after the curing treatment.

Magnetic tapes were fabricated in Examples and Comparative Examples by the processes set forth above.

[Evaluation Methods]

1. Measurement of Centerline Average Surface Roughness Ra

A measurement area within a range of 40 μm×40 μm was measured on the surface on the magnetic layer side of the magnetic tapes of Examples and Comparative Examples with an atomic force microscope (Nanoscope 4 made by Veeco) and the centerline average surface roughness Ra was determined. A scan rate (probe displacement rate) of 40 μm/s and a resolution of 512 pixels×512 pixels were employed.

2. Measurement of Logarithmic Decrement

An RPT-3000W rigid-body pendulum-type physical property-testing instrument made by A&D Co., Ltd. (pendulum: made of brass; substrate: glass substrate; rate of substrate temperature increase: 5° C./min) was employed as the measurement device to determine the logarithmic decrements of the surfaces on the magnetic layer sides of the magnetic tapes of Examples and Comparative Examples by the method set forth above. A measurement sample that was cut out of the magnetic tape of each of Examples or Comparative Examples was placed on a glass substrate about 3 cm×about 5 cm in size and secured in four spots with immobilizing tape (Kapton tape, made by Du Pont-Toray Co., Ltd.) as shown in FIG. 1. An attraction time of 1 second and a measurement interval of 7 to 10 seconds were employed, and a displacement-time curve was plotted for the 86th measurement interval. This curve was used to determine the logarithmic decrement. Measurements were conducted in an environment with a relative humidity of about 50%.

3. Measurement of the Electromagnetic Characteristics (Signal-to-Noise Ratio (SNR)) and the Amount of Drop in Reproduction Output with Repeated Running The electromagnetic characteristics (SNR) and amount of drop in output with repeated running were measured by the following method using a ½ inch (0.0127 meter) reel tester to which a head had been secured.

A head/tape relative speed of 5.5 m/s was adopted. A metal-in-gap (MIG) head (gap length: 0.15 μm; track width: 1.0 μm) was employed. The recording current was set to the optimal recording current for each tape. A giant-magnetoresistive (GMR) head with an element thickness of 15 nm, a shield gap of 0.1 μm, and a read width of 0.5 μm was employed as the reproduction head. A signal was recorded at a linear recording density of 300 KFci, and the reproduced signal was measured with a spectrum analyzer made by Shibasoku Co., Ltd. A fully stabilized portion of the signal after the tape had begun to run was employed as the signal. Recording and reproduction were conducted by making 500 sliding passes of 1,000 m per pass. The ratio of the output value of the carrier signal to the integrated noise of the full spectral bandwidth was adopted as the SNR. Relative values for when Comparative Example 3 was adopted as the base (0 dB) for Examples and Comparative Examples in which ferromagnetic hexagonal barium ferrite powder (BF) was employed as the ferromagnetic powder, and for when Comparative Example 15 was adopted for Examples and Comparative Examples in which ferromagnetic metal powder (MP) was employed, are given for the first pass SNR as the broadband-SNR (BB-SNR) indicated in Table 1.

The output value of the 1st pass carrier signal and the output value of the 500th pass carrier signal were determined, and the difference ((output value of 1st pass)−(output value of 500th pass)) is given in Table 1 as the amount of drop in the reproduction output with repeated running.

In the magnetic tape of Comparative Example 7, there were numerous scratches on the surface on the magnetic layer side of the magnetic tape. As a result, the head clogged during the 1st pass, making it impossible to obtain a reproduction signal, and the evaluation was halted.

4. Evaluation of Amount of Material Adhering to Head

Following the measurement of 3. above, the surface of the reproduction head following 500 back-and-forth passes was observed by a differential interference microscope. The amount of material adhering to the head was evaluated on the following scale according to the amount of area over which material was determined to have adhered in a microscopic image taken by differential microscopic observation.

5 points: Almost no material adhering to head 4 points: Slight amount of material observed adhering to head 3 points: Material observed adhering to head
2 points: Substantial material observed adhering to head
1 point: Extremely large amount of material observed adhering to head The results of the above are given in Table 1.

TABLE 1

| | Ex. 1 | Ex. 2 | Ex. 3 | Ex. 4 | Ex. 5 |
|---|---|---|---|---|---|
| Ferromagnetic powder | BF | BF | BF | BF | BF |
| Average particle size of colloidal silica (nm) | 80 | 80 | 80 | 80 | 80 |
| Cooling zone residence time | 1 s | 5 s | 60 s | 120 s | 180 s |
| Burnish treatment before curing step | Implemented | Implemented | Implemented | Implemented | Implemented |
| Burnish treatment after curing step | Not implemented | Not implemented | Not implemented | Not implemented | Not implemented |
| Calender temp. (° C.) | 110 | 110 | 110 | 110 | 110 |
| Centerline average surface roughness Ra on the surface on the magnetic layer side (nm) | 1.8 | 1.8 | 1.8 | 1.8 | 1.8 |
| Logarithmic decrement on the surface on the magnetic layer side | 0.048 | 0.042 | 0.034 | 0.021 | 0.015 |
| BB-SNR (dB) | 1.5 | 1.6 | 1.5 | 1.5 | 1.5 |
| Amount of drop in the reproduction output with repeated running (dBm) | −0.8 | −0.6 | −0.4 | −0.2 | −0.1 |
| Evaluation of amount of material adhering to head after repeated running 5 (Few amount) ←→ 1 (Much amount) | 5 | 5 | 5 | 5 | 5 |

| | Ex. 6 | Ex. 7 | Ex. 8 | Ex. 9 | Ex. 10 | Ex. 11 | Ex. 12 |
|---|---|---|---|---|---|---|---|
| Ferromagnetic powder | BF | BF | BF | BF | BF | MP | MP |
| Average particle size of colloidal silica (nm) | 40 | 40 | 80 | 40 | 40 | 80 | 40 |
| Cooling zone residence time | 5 s | 5 s | 5 s | 5 s | 5 s | 5 s | 5 s |
| Burnish treatment before curing step | Implemented | Implemented | Implemented | Implemented | Implemented | Implemented | Implemented |
| Burnish treatment after curing step | Not implemented | Not implemented | Implemented | Implemented | Implemented | Not implemented | Not implemented |
| Calender temp. (° C.) | 90 | 110 | 110 | 90 | 110 | 110 | 110 |
| Centerline average surface roughness Ra on the surface on the magnetic layer side (nm) | 1.6 | 1.4 | 1.8 | 1.6 | 1.4 | 1.8 | 1.4 |
| Logarithmic decrement on the surface on the magnetic layer side | 0.040 | 0.045 | 0.041 | 0.038 | 0.042 | 0.040 | 0.038 |
| BB-SNR (dB) | 2.4 | 4.0 | 1.5 | 2.5 | 3.8 | 1.5 | 3.8 |
| Amount of drop in the reproduction output with repeated running (dBm) | −0.6 | −0.4 | −0.5 | −0.6 | −0.5 | 0.6 | −0.5 |
| Evaluation of amount of material adhering to head after repeated running 5 (Few amount) ←→ 1 (Much amount) | 5 | 5 | 5 | 5 | 5 | 5 | 5 |

| | Comp. Ex. 1 | Comp. Ex. 2 | Comp. Ex. 3 | Comp. Ex. 4 | Comp. Ex. 5 |
|---|---|---|---|---|---|
| Ferromagnetic powder | BF | BF | BF | BF | BF |
| Average particle size of colloidal silica (nm) | 120 | 120 | 80 | 80 | 40 |
| Cooling zone residence time | Not implemented | Not implemented | Not implemented | Not implemented | Not implemented |
| Burnish treatment before curing step | Not implemented | Not implemented | Implemented | Not implemented | Not implemented |
| Burnish treatment after curing step | | | | | Implemented |
| Calender temp. (° C.) | 90 | 110 | 90 | 110 | 90 |
| Centerline average surface roughness Ra on the surface on the magnetic layer side (nm) | 2.4 | 2.2 | 2.0 | 1.8 | 1.6 |

TABLE 1-continued

|  | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
| Logarithmic decrement on the surface on the magnetic layer side |  |  | 0.062 | 0.061 | 0.063 |  | 0.064 |
| BB-SNR (dB) | -2.5 |  | -1.2 | 0 | 1.4 |  | 2.4 |
| Amount of drop in the reproduction output with repeated running (dBm) | -0.1 |  | -0.5 | -0.8 | -2.4 |  | -3.8 |
| Evaluation of amount of material adhering to head after repeated running (Few amount) 5 ←→ 1 (Much amount) | 5 |  | 5 | 5 | 4 |  | 3 |
| Ferromagnetic powder | BF | BF | BF | BF | BF | BF | BF |
| Average particle size of colloidal silica (nm) | 40 | 80 | 120 | 80 | 40 | 80 | 80 |
| Cooling zone residence time | Not implemented | Not implemented | Not implemented | Not implemented | Not implemented | 1 s | 5 s |
| Burnish treatment before curing step | Not implemented | Not implemented | Not implemented | Not implemented | Not implemented | Not implemented | Not implemented |
| Burnish treatment after curing step | Implemented | Implemented (10⊠) | Implemented | Implemented | Implemented | Implemented | Implemented |
| Calender temp. (° C.) | 110 | 110 | 90 | 110 | 110 | 110 | 110 |
| Centerline average surface roughnes Ra on the surface on the magnetic layer side (nm) | 1.4 | 1.8 | 2.4 | 1.8 | 1.4 | 1.8 | 1.8 |
| Logarithmic decrement on the surface on the magnetic layer side | 0.064 | 0.056 | 0.055 | 0.055 | 0.055 | 0.068 | 0.072 |
| BB-SNR (dB) | 4.0 | 1.5 | -2.5 | 1.4 | 4 | 1.5 | 1.5 |
| Amount of drop in the reproduction output with repeated running (dBm) | -4.5 | -8.0 | -0.1 | -1.7 | -3.2 | -4.0 | -5.8 |
| Evaluation of amount of material adhering to head after repeated running (Few amount) 5 ←→ 1 (Much amount) | 3 | 1 | 5 | 4 | 3 | 3 | 2 |
| Tape scratches present |  | Evaluation was impossible.* | Evaluation was impossible.* |  |  |  |  |

|  | Comp. Ex. 13 | Comp. Ex. 14 | Comp. Ex. 15 | Comp. Ex. 16 |
|---|---|---|---|---|
| Ferromagnetic powder | BF | BF | MP | MP |
| Average particle size of colloidal silica (nm) | 80 | 120 | 80 | 40 |
| Cooling zone residence time | 60 s | 5 s | Not implemented | Not implemented |
| Burnish treatment before curing step | Not implemented | Implemented | Not implemented | Not implemented |
| Burnish treatment after curing step | Implemented | Implemented | Implemented | Implemented |
| Calender temp. (° C.) | 110 | 90 | 90 | 110 |
| Centerline average surface roughnes Ra on the surface on the magnetic layer side (nm) | 1.8 | 2.4 | 2.0 | 1.4 |
| Logarithmic decrement on the surface on the magnetic layer side | 0.084 | 0.041 | 0.061 | 0.064 |
| BB-SNR (dB) | 1.5 | -2.5 | 0 | 3.8 |
| Amount of drop in the reproduction output with repeated running (dBm) | -8.0 | -0.1 | -0.8 | -3.6 |
| Evaluation of amount of material adhering to head after repeated running (Few amount) 5 ←→ 1 (Much amount) | 1 | 5 | 5 | 3 |

*Tape scratches present

Based on the results given in Table 1, it can be confirmed that the magnetic tapes of Examples exhibited high SNRs and were found to undergo little drop in output with repeated running.

An aspect of the present invention is useful in the technical field of magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

The invention claimed is:

1. A magnetic tape,
which comprises a magnetic layer comprising ferromagnetic powder and binder on a nonmagnetic support,
wherein the logarithmic decrement as determined by a pendulum viscoelasticity test on the surface on the magnetic layer side of the magnetic tape is greater than or equal to 0.010 but less than or equal to 0.050, and
the logarithmic decrement is determined by the following method:
securing a measurement sample of the magnetic tape with the measurement surface, which is the surface on the magnetic layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement $\Delta$ from the following equation:

$$\Delta = \frac{\ln\left(\frac{A_1}{A_2}\right) + \ln\left(\frac{A_2}{A_3}\right) + \Lambda \ \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1,
wherein the magnetic layer comprises at least one type of nonmagnetic filler.

3. The magnetic tape according to claim 2,
wherein the nonmagnetic filler comprises colloidal particles.

4. The magnetic tape according to claim 1,
which comprises a nonmagnetic layer comprising nonmagnetic powder and binder between the nonmagnetic support and the magnetic layer.

5. A method of manufacturing a magnetic tape,
wherein the magnetic tape is a magnetic tape which comprises a magnetic layer comprising ferromagnetic powder and binder on a nonmagnetic support, wherein the logarithmic decrement as determined by a pendulum viscoelasticity test on the surface on the magnetic layer side of the magnetic tape according to the method recited in claim 1 is greater than or equal to 0.010 but less than or equal to 0.050, and
the method of manufacturing the magnetic tape comprises forming a magnetic layer, with the forming of a magnetic layer comprising:
coating a magnetic layer-forming composition containing ferromagnetic powder, binder, a curing agent, and solvent on a nonmagnetic support, either directly or over another layer to form a coating layer;
heating and drying the coating layer by a heat treatment; and
curing the coating layer by subjecting the coating layer to a curing treatment;
with cooling the coating layer after the coating but before the heating and drying, and
burnishing the surface of the coating layer after the heating and drying but before the curing.

6. The method of manufacturing a magnetic tape according to claim 5,
wherein the cooling is conducted by placing the coating layer in a cooling atmosphere ranging from −10° C. to 0° C.

7. The method of manufacturing a magnetic tape according to claim 5,
wherein the solvent that is contained in the magnetic layer-forming composition comprises ketone solvent.

8. The method of manufacturing a magnetic tape according to claim 6,
wherein the solvent that is contained in the magnetic layer-forming composition comprises ketone solvent.

9. The method of manufacturing a magnetic tape according to claim 5,
wherein the curing agent is a thermosetting compound and the curing is conducted by a heat treatment.

10. The method of manufacturing a magnetic tape according to claim 9,
   wherein the thermosetting compound is polyisocyanate.

11. The method of manufacturing a magnetic tape according to claim 5,
   wherein surface-smoothing is conducted after the burnishing but before the curing.

12. The method of manufacturing a magnetic tape according to claim 5,
   wherein the magnetic layer comprises at least one type of nonmagnetic filler.

13. The method of manufacturing a magnetic tape according to claim 12,
   wherein the nonmagnetic filler comprises colloidal particles.

14. The method of manufacturing a magnetic tape according to claim 5,
   wherein the magnetic tape comprises a nonmagnetic layer comprising nonmagnetic powder and binder between the nonmagnetic support and the magnetic layer.

* * * * *